(12) United States Patent
Hall et al.

(10) Patent No.: US 9,909,363 B1
(45) Date of Patent: Mar. 6, 2018

(54) WINDOW BLIND WITH PRESSURE SENSOR WHICH ACTIVATES LIGHT AND SOUND IN SEQUENCE

(71) Applicants: David R. Hall, Provo, UT (US); Austin Carlson, Provo, UT (US); Emily Brimhall, Apline, UT (US); Terrece Pearman, Draper, UT (US); Jennifer Stevens, Provo, UT (US)

(72) Inventors: David R. Hall, Provo, UT (US); Austin Carlson, Provo, UT (US); Emily Brimhall, Apline, UT (US); Terrece Pearman, Draper, UT (US); Jennifer Stevens, Provo, UT (US)

( * ) Notice: Subject to any disclaimer, the term of this patent is extended or adjusted under 35 U.S.C. 154(b) by 0 days.

(21) Appl. No.: 15/444,689

(22) Filed: Feb. 28, 2017

(51) Int. Cl.
| G08B 13/20 | (2006.01) |
| E06B 9/386 | (2006.01) |
| H05B 37/02 | (2006.01) |
| H04R 1/02 | (2006.01) |
| E06B 9/28 | (2006.01) |
| G08B 15/00 | (2006.01) |

(52) U.S. Cl.
CPC .............. *E06B 9/386* (2013.01); *E06B 9/28* (2013.01); *G08B 13/20* (2013.01); *G08B 15/002* (2013.01); *H04R 1/028* (2013.01); *H05B 37/0227* (2013.01); *H05B 37/0272* (2013.01); *H04R 2420/07* (2013.01)

(58) Field of Classification Search
None
See application file for complete search history.

(56) References Cited

U.S. PATENT DOCUMENTS

| 4,956,588 | A | * | 9/1990 | Ming | E06B 9/32 160/331 |
| 5,274,357 | A | * | 12/1993 | Riordan | G08B 13/126 160/10 |
| 5,377,739 | A | * | 1/1995 | Kirby | A47H 5/00 160/166.1 |
| 5,552,769 | A | * | 9/1996 | Riordan | G08B 13/08 160/10 |
| 2001/0022218 | A1 | * | 9/2001 | Schlecht | B60J 1/2022 160/370.22 |
| 2015/0122474 | A1 | * | 5/2015 | Petersen | G05D 23/1917 165/287 |

* cited by examiner

*Primary Examiner* — Adolf Dsouza

(57) ABSTRACT

We disclose a window blind that includes a security feature. The disclosed window blind includes a plurality of slats, at least one of which includes a hollow core. The hollow core includes at least one pressure sensor, a controller, and a battery. The pressure sensor detects a change in pressure when an adjacent window or door is opened or broken. The controller may be connected to the pressure sensor and to multiple light fixtures and/or audio speakers throughout the building. Program code in the controller may receive instructions which include a defined order in which the controller sends a signal to each of the light fixtures and audio speakers causing them to actuate.

20 Claims, 8 Drawing Sheets

WINDOW BLIND WITH PRESSURE SENSOR WHICH ACTIVATES LIGHT AND SOUND IN SEQUENCE

BACKGROUND

Field of the Invention

This disclosure relates to window coverings, specifically window blinds that include a security feature.

Background of the Invention

Security devices for homes and businesses are available which turn on lights and initiate sounds such as an audible alarm. Typically, the security device includes a sensor that detects a break-in then turns on a light and/or an audible alarm in the immediate vicinity of the site the break-in was detected.

These devices are designed to frighten off a would-be intruder. However, an intruder who believes the building to be unoccupied may still enter the building. Even if the intruder is in the building for a brief time, significant damage and loss of property may occur.

A security device is needed which detects a break-in at an intruder's point of entry and which creates a series of visual and/or audible events which suggest to an intruder that the building is occupied. Such a security device may prevent an intruder from proceeding into the building thus saving the building contents from damage and possibly preventing a building occupant from harm.

BRIEF SUMMARY OF THE INVENTION

We disclose a window blind that may use one or more pressure sensors to detect when an adjacent window or door has been opened or broken then initiate lights and/or sounds in other locations in the building. This series of lights or sounds in locations that are not adjacent to the broken window or door may indicate to an intruder that the building is occupied and that the occupant has been alerted to the break-in.

One or more pressure sensors may be included in a hollow channel within one or more slats of the window blind. The pressure sensor may detect a sudden change in pressure and send a signal to a controller. The controller may then send a signal through a data communication device to a remote device which may report the possible break-in to a user.

The hollow channel within a slat may house the controller and a battery. The controller may include a memory, program code, and a connection to multiple light fixtures and/or audio speakers. The light fixtures and audio speakers may be placed in rooms throughout the building other than the one in which the window blind is located. When the one or more pressure sensor detects a change in pressure near the window, the program code stored in the controller's memory may send a signal to the multiple light fixtures causing the lights to turn on according to a first defined sequence stored in the program code. A user may reprogram the program code by sending input data from the remote device communicating a new first defined sequence.

In addition, or in the alternative, the controller may be connected to an audio device. The audio device may be connected to multiple audio speakers which may be located in rooms other than the one in which the window blind is located. The controller may activate the audio device in response to a signal from the one or more pressure sensors. The audio device may send a signal to the multiple audio speakers causing them to emit sounds stored in an audio recording device within the audio device according to a second defined sequence. A user may reprogram the program code by sending input data from the remote device communicating a new second defined sequence.

DETAILED DESCRIPTION OF THE INVENTION

Definitions

Figure 1A:
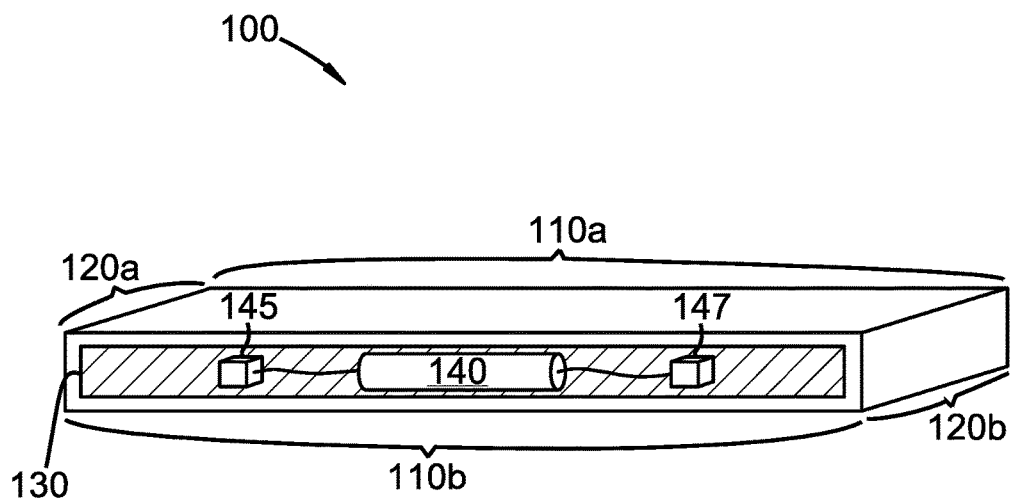
FIG. 1A illustrates a perspective view of a slat from a window blind according to an embodiment of the disclosure in which the cross-section of the slat is rectangular.

Window blind, as used herein, means a blind that covers an opening in a building, including a window or door.

While this invention is susceptible of embodiment in many different forms, there are shown in the drawings, which will herein be described in detail, several specific embodiments with the understanding that the present disclosure is to be considered as an exemplification of the principals of the invention and is not intended to limit the invention to the illustrated embodiments.

We disclose a window blind that includes a security mechanism positioned, at least in part, within the slats of the window blind. The window blind may include a plurality of slats which may be mounted on at least two tilt strings. Each slat may include two longitudinal sides and two transverse sides. In some embodiments, the longitudinal sides of the slats may have a length that is at least five times the width of the transverse sides.

The slats may perform a tilting movement when the at least two tilt strings move. The tilt strings may be moved manually or through an automated mechanism which may be powered by a battery. This tilting movement may move the of slats between an open position and a closed position so that the user may control the amount of light the slats allow to enter the adjacent room. Accordingly, when the slats are in the open position, the two transverse sides of each of the slats may be perpendicular to the at least two tilt strings.

When the slats are in the closed position, the two transverse sides of each of the slats may be parallel to the at least two tilt strings.

One or more of the slats may include a hollow core with at least one pressure sensor inside the hollow core. An orifice may lead into the hollow core so that the one or more pressure sensors may detect when an adjacent window or door has been opened or broken by detecting the brief change in air pressure that occurs. In some embodiments, the orifice is positioned along one of the longitudinal sides of the slat. This positions the slat so that the orifice, and consequently, the pressure sensor, is directed toward the space between the window blind and the adjacent window or door.

The one or more pressure sensors may be, but are not limited to, the following types of pressure transducers: a strain gage pressure transducer, variable capacitance pressure transducer, and piezoelectric pressure transducer. The window blind may include more than one type of pressure sensor.

The hollow core may also house one or more of the following: a controller, a battery, and a data communication device. Alternatively, the data communication device may be placed in the headrail of the window blind. The controller may be electronically connected to the one or more pressure sensors and to the data communication device. The controller may include a memory which stores program code. The program code may direct the window blind's responses to a change in pressure as detected by the pressure sensor.

In some embodiments, the controller may transmit a signal, through the data communication device, to a remote device when the one or more pressure sensors detects a change in air pressure and communicates this event to the controller through a first signal. The data communication device may also receive input data from the remote device. For example, the remote device may be a user's mobile device. The data communication device may send a signal to the user's mobile device informing the user that the pressure sensor has detected a change in air pressure and suggesting a possible break-in. The user may also use the mobile device to enter input data which may define series of lights and sounds that occur within the building when the pressure sensor detects a change in air pressure.

The controller may also be electronically connected to multiple light fixtures. The multiple light fixtures may be located in different parts of the building. When the controller receives a first signal from the pressure sensor indicating a change in pressure, the program code stored in the controller may prompt the controller to send a second signal through the data communication device to the multiple light fixtures. The second signal may signal the light fixtures to turn on in a defined sequence, referred to herein as the first sequence. The order of light fixture illumination may mimic a building occupant moving through the building turning on light fixtures having been alerted to a break-in. In some embodiments, the user may choose the order in which the light fixtures turn on (the first sequence) by entering the first sequence into the remote device in the form of input data.

In some embodiments, the controller may be electronically connected to the one or more pressure sensors and to the multiple light fixtures through a wireless device. The wireless device may include a Bluetooth device.

In addition, or in the alternative, some embodiments may include an audio device. The audio device may include an audio recording device. The audio device may be electronically connected to the controller and to multiple audio speakers. The multiple audio speakers may be located in different parts of the building. When the controller receives a first signal from the pressure sensor indicating a change in pressure, the program code stored in the controller may prompt the controller to send a subsequent signal through the data communication device to the audio device. The audio device may send a signal through the data communication device to the audio speakers causing the audio speakers to emit sound in a defined sequence, referred to herein as the first sequence. The order in which the audio speakers are actuated may mimic a building occupant moving through the building and making sounds having been alerted to a break-in. In some embodiments, the user may choose the order in which the audio speakers emit sound (the second sequence) by entering the second sequence into the remote device in the form of input data.

The sounds that each of the audio speakers emits may be different sounds including, but not limited to, a barking dog, a siren, a door opening, the sound of footsteps, and a human voice. In some embodiments, the human voice is a recording of a user's voice which the user has recorded on the audio recording device. In some embodiment, the user may transmit his or her voice to the audio recording device through the remote device.

In some embodiments, the controller may be electronically connected to the one or more pressure sensors and to the audio device through a wireless device. The wireless device may include a Bluetooth device.

Referring now to the drawings, FIG. 1A is a perspective view of slat 100, which may be included in an embodiment of the disclosed window blind. Slat 100 includes longitudinal sides 110*a* and 110*b* as well as transverse sides 120*a* and 120*b*. Orifice 130 leads into a hollow core (shown with cross hatches) within slat 100. In this embodiment, orifice 130 is along longitudinal side 110*b*. Pressure sensor 140 is within the hollow core. Controller 145 and battery 147 are also within the hollow core and shown with wires connecting controller 145 and battery 147 to pressure sensor 140.

Figure 1B:
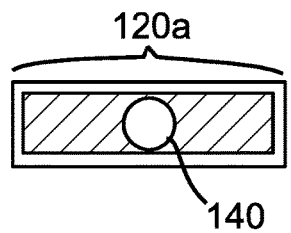
FIG. 1B illustrates a transverse cross-sectional view of the slat of FIG. 1A.

FIG. 1B is a cross-sectional view of slat 100. The cross section is taken through pressure sensor 140 in a plane that is parallel to transverse sides 120*a* and 120*b*. Note that the cross-section of slat 100 is approximately rectangular in shape.

Figure 2A:
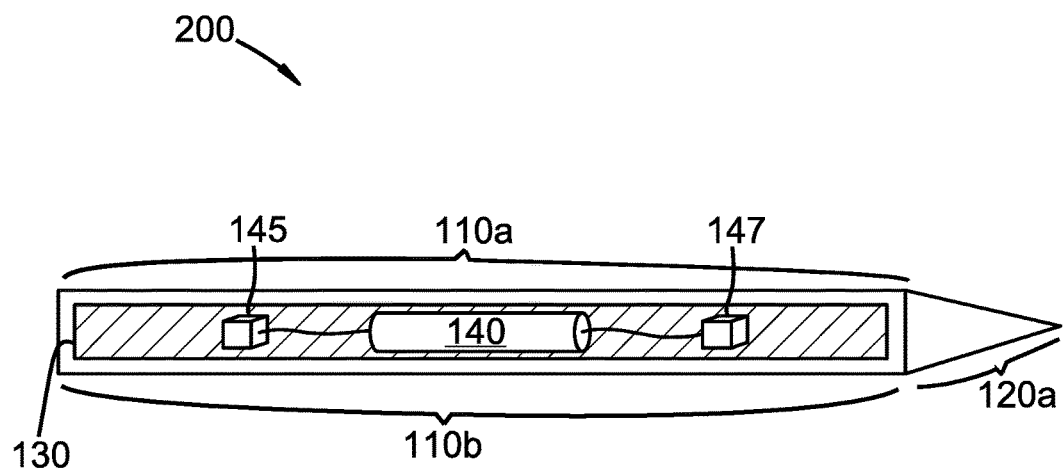
FIG. 2A illustrates a perspective view of a slat from a window blind according to an embodiment of the disclosure in which the cross-section of the slat is triangular.

FIG. 2A shows a perspective view of slat 200, which may be included in an embodiment of the disclosed window blind. Similar to slat 100, slat 200 includes longitudinal sides 110*a* and 110*b* as well as transverse sides 120*a* and 120*b*. Orifice 130 leads into a hollow core (shown with cross hatches) within slat 200. In this embodiment, orifice 130 is along longitudinal side 110*b*. Pressure sensor 140 is within the hollow core of slat 200. Controller 145 and battery 147 are also within the hollow core and shown with wires connecting controller 145 and battery 147 to pressure sensor 140.

Figure 2B:
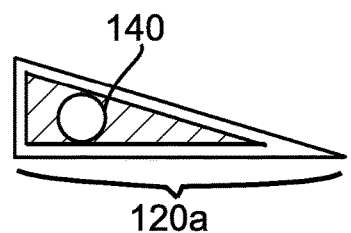
FIG. 2B illustrates a transverse cross-sectional view of the slat of FIG. 2A.

FIG. 2B illustrates a difference between slat 100 and slat 200. FIG. 2B is a cross-sectional view of slat 200. The cross section is taken through pressure sensor 140 in a plane that is parallel to transverse sides 120*a* and 120*b*. However, unlike slat 100 as shown in FIG. 1B, the cross-section shown in FIG. 2B illustrates that the cross-section of slat 200 is approximately triangular in shape.

Figure 3A:
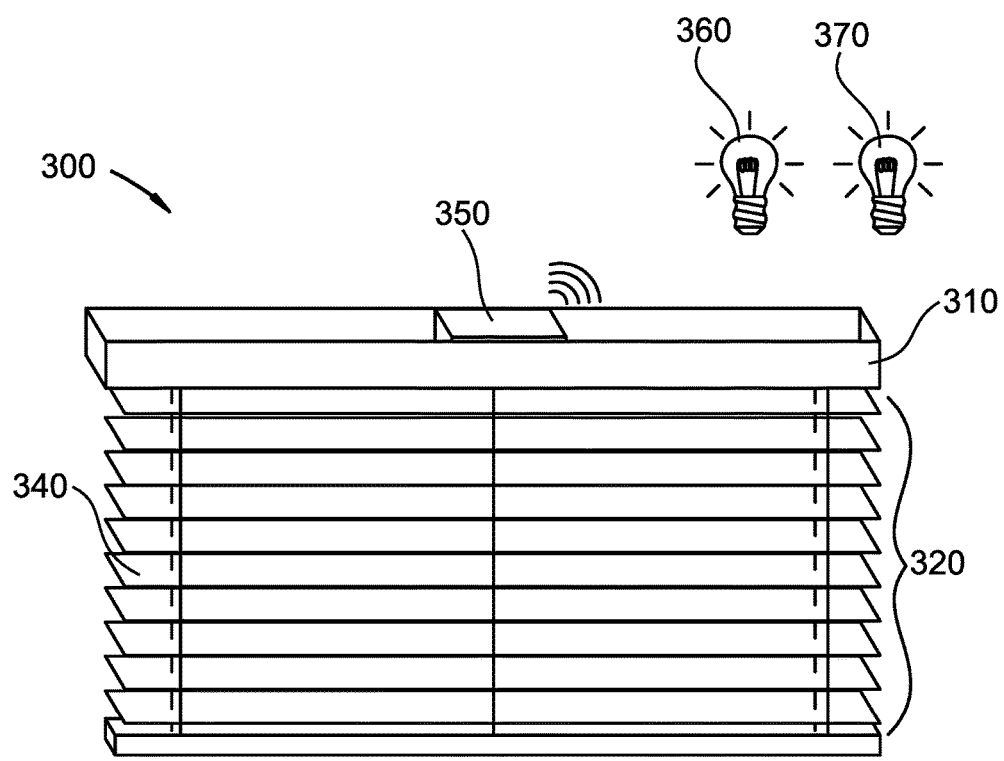
FIG. 3A illustrates an embodiment of the disclosed window blind in which the controller is wirelessly connected to a series of light fixtures.

FIG. 3A shows window blind 300 which is an embodiment of the disclosed window blind. Window blind 300 includes headrail 310 and plurality of slats 320. Although not drawn in FIG. 3A for purposes of clarity, slat 340 includes a hollow core with a pressure sensor, a controller, and a battery housed within. An orifice exposes the hollow core so that the pressure sensor may sense changes in pressure in the area near plurality of slats 320. In window blind 300, data communication device 350 is positioned within headrail 310. In other embodiments, the data communication device may be housed in a hollow core within a slat. Data communication device 350 may transmit signals and other data between the controller within slat 340 and a remote device.

FIG. 3A further illustrates light fixtures 360 and 370. Data communication device 350 shown transmitting a wireless signal to light fixtures 360 and 370 after the pressure sensor has communicated to the controller that a change in air pressure has occurred. The first sequence, which may be stored in the memory of the controller, instructs light fixture 360 to illuminate first followed by light fixture 370. Light fixtures 360 and 370 may be positioned in different rooms in the building suggesting that an occupant is turning on lights while moving through the building.

Figure 3B:
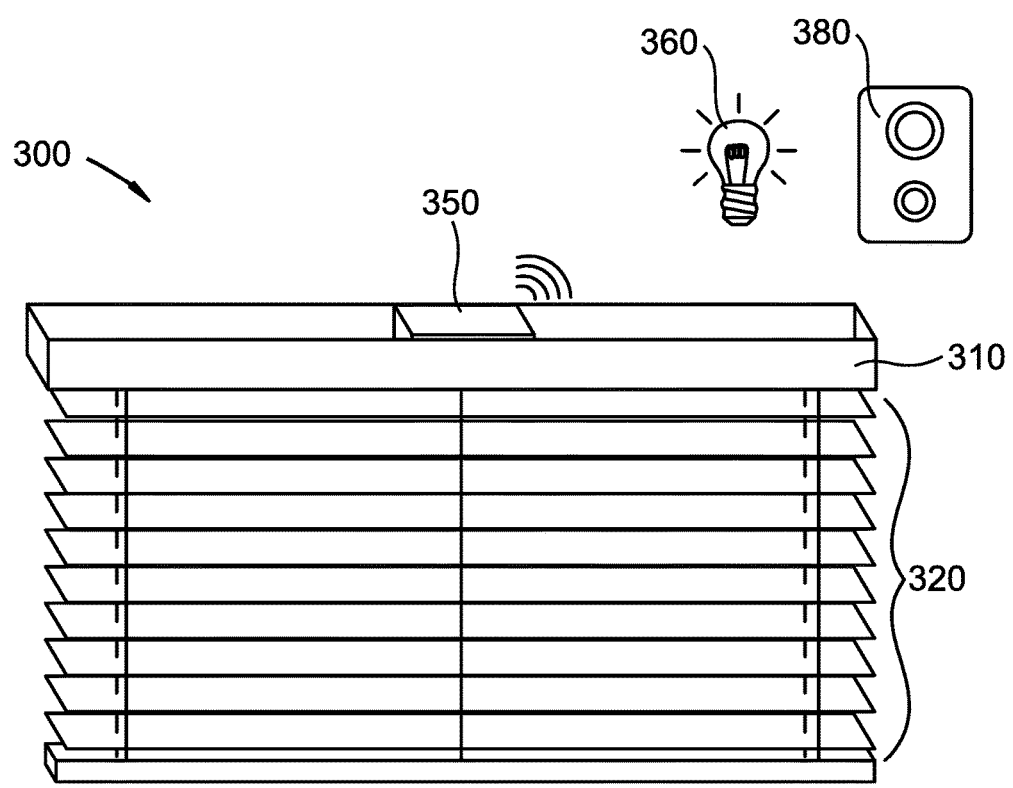
FIG. 3B illustrates an embodiment of the disclosed window blind in which the controller is wirelessly connected to a light fixture and an audio speaker.

FIG. 3B again illustrates window blind 300 as shown in FIG. 3A. However, FIG. 3B shows data communication device 350 transmitting a wireless signal to light fixtures 360 and audio speaker 380. As discussed with regard to FIG. 3A, a first sequence, which may be stored in the memory of the controller, instructs light fixture 360 to illuminate first followed by other light fixtures. A second sequence then actuates audio speaker 380 causing it to emit an audible sound followed by other audio speakers. The combination of light and sound in sequence mimics a building occupant moving through the building.

Figure 4A:
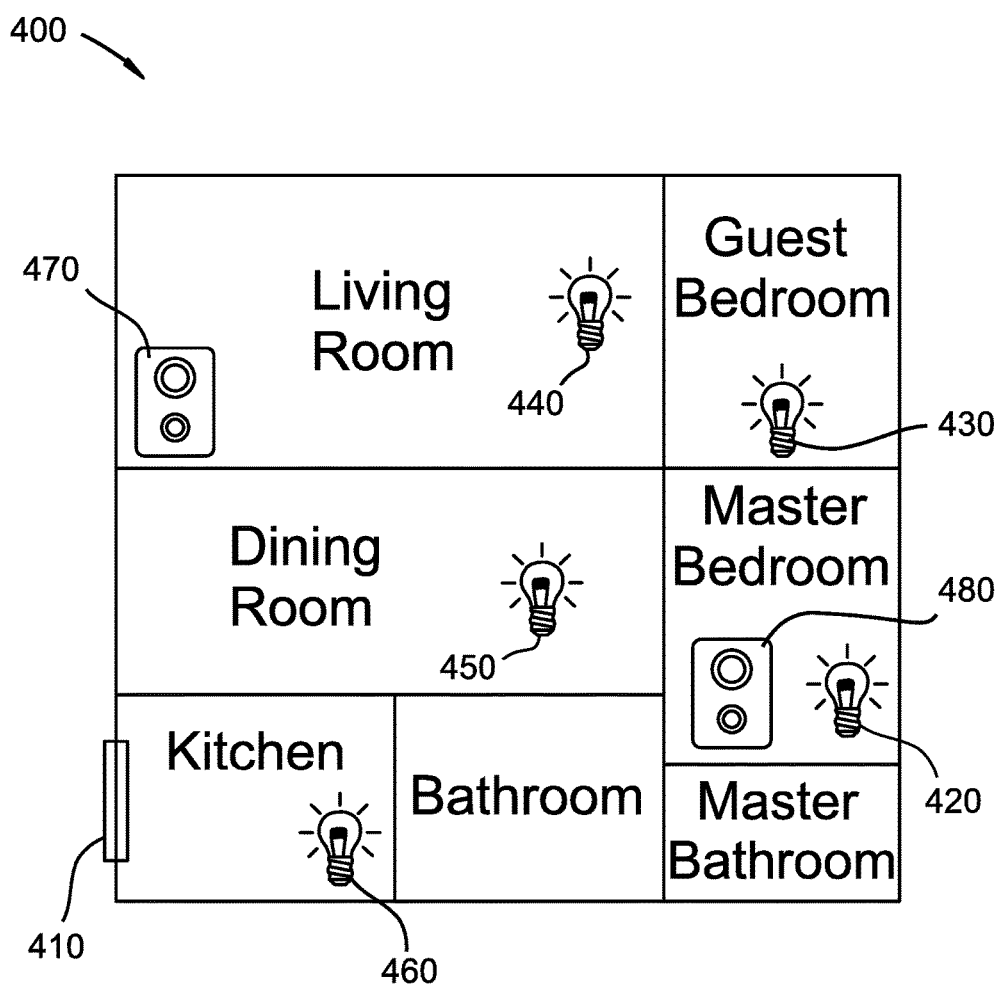
FIG. 4A illustrates a floor plan of a dwelling in which an embodiment of the disclosed window blind is installed.

FIG. 4A illustrates floorplan 400 of a dwelling with the location of window 410 indicated. A window blind according to the disclosure is mounted in window 410. Light fixtures 420, 430, 440, 450, and 460 may be turned on in a first sequence when they receive a signal, which may be wired or wireless, from the embodiment of the disclosed window blind on window 410. Audio speakers 470 and 480 may emit noises in a second sequence when they receive a signal, which may be wired or wireless, from the window blind adjacent to window 410.

Figure 4B:
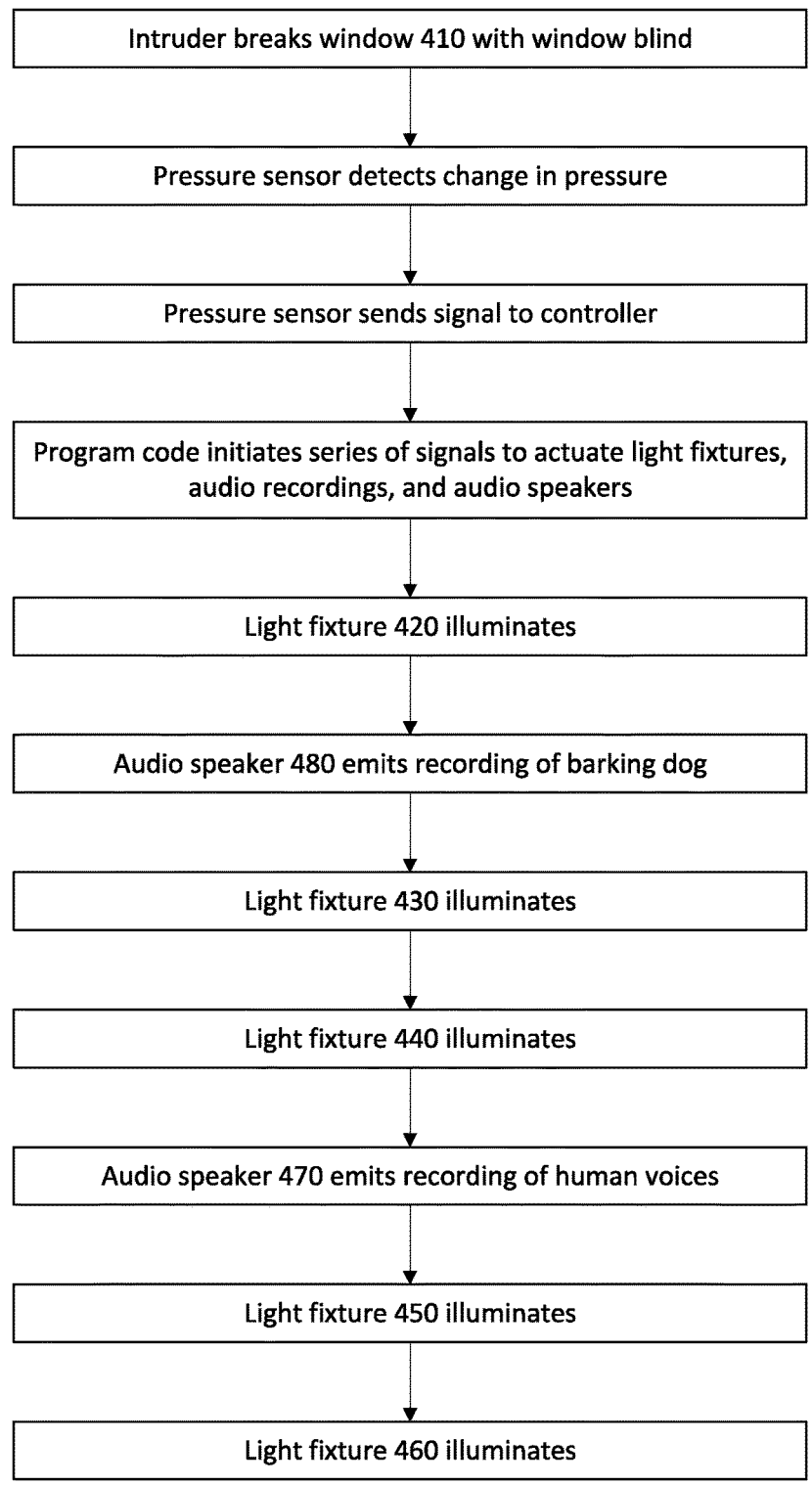
FIG. 4B is a flow chart illustrating an embodiment of the disclosed window blind and its use.

FIG. 4B is a flow chart of an embodiment of the disclosed window blind responding to a break in window 410 of FIG. 4A. Referring to FIG. 4A, the process begins when intruder breaks or opens window 410. A pressure sensor, which may be located in a hollow core within one or more slats of the window blind that is mounted in window 410, detects a change in pressure adjacent to window 410. The pressure sensor sends a signal to a controller containing a memory with program code. The program code initiates a series of signals to actuate light fixtures, audio recordings, and audio speakers. In this embodiment, the first and second sequences result in the following actions. First, light fixture 420 illuminates. Second, audio speaker 480 emits a recording of a barking dog. Third, light fixture 430 illuminates. Fourth, light fixture 440 illuminates. Fifth, audio speaker 470 emits a recording of human voices. Sixth, light fixture 450 illuminates. Finally, light fixture 460 illuminates.

Figure 5:
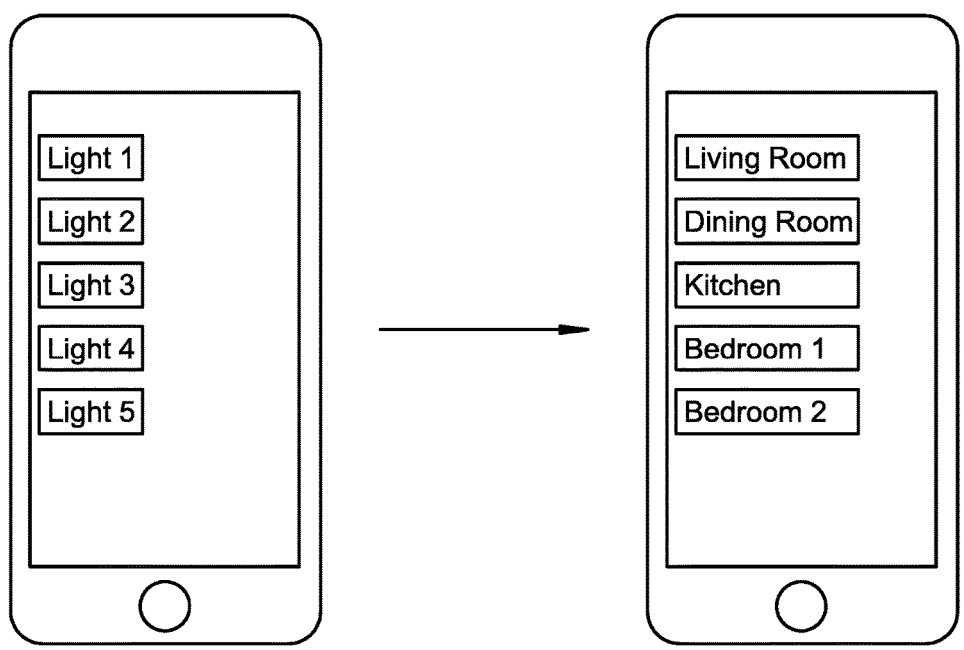
FIG. 5 illustrates two screens of a mobile device which may be used to define the order the light fixtures may illuminate in response to a pressure change.

FIG. 5 illustrates two screens of a mobile device which may be use to communicate with a controller within an embodiment of the disclosed window blind. The screen on the left may allow the user to choose the order in which the lights go on after the pressure sensor responds to a pressure change. In other words, Light 1 would turn on first, Light 2 would turn on second, and so forth. After the user chooses a button from the left screen, the right screen may appear, allowing the user to select a light fixture in a corresponding room. For example, the user may select Light 1 from the first screen which will cause the second screen to be visible. The user may select Living Room on the second screen. The living room light will be the first of the series to illuminate when the pressure sensor is activated. The first screen may again be visible and the user may select Light 2. The second screen may again become visible and the user may select Bedroom 1. The light fixture that is installed in the room the user has defined as Bedroom 1 will be the second light in the series to illuminate. The user may continue this process until the desired order the light fixtures has been entered through the mobile device.

Figure 6:
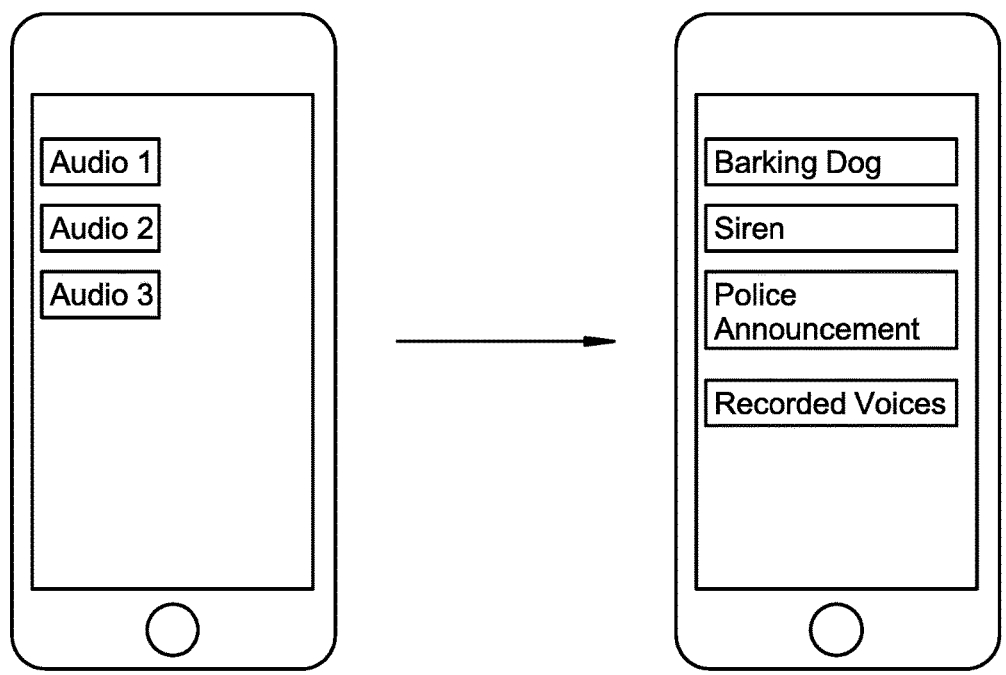
FIG. 6 illustrates two screens of a mobile device which may be to define the order the audio recordings may be actuated in response to a pressure change.

FIG. 6 illustrates another two screens of a mobile device which may be used to communicate a second series to a controller within an embodiment of the disclosed security device. The second series refers to the order in which multiple audio speakers emit sounds in response to a change in pressure near the disclosed window blind. In this embodiment, the screen on the left may allow the user to choose the order the audio speakers emit sound after the pressure sensor responds to a pressure change. In other words, Audio 1 may emit sound first, Audio 2 may emit sound second, and so forth. After the user chooses a button from the left screen, for example, Audio 1, the right screen may appear, allowing the user to assign an audio recording to a corresponding speaker. The audio speaker corresponding to Audio 1 may be located in a room the user has chosen, for example, the master bedroom. Therefore, by choosing, for example, Audio 1 from the first screen then choosing barking dog from the second screen, the first sound in the series will be a recording of a barking dog that is heard from a speaker in the master bedroom. The user may then proceed to assign sounds to other speakers in other rooms in a chosen order similar to the method used to program the light fixtures in FIG. 5.

While specific embodiments have been illustrated and described above, it is to be understood that the disclosure provided is not limited to the precise configuration, steps, and components disclosed. Various modifications, changes, and variations apparent to those of skill in the art may be made in the arrangement, operation, and details of the methods and systems disclosed, with the aid of the present disclosure.

Without further elaboration, it is believed that one skilled in the art can use the preceding description to utilize the present disclosure to its fullest extent. The examples and embodiments disclosed herein are to be construed as merely illustrative and exemplary and not a limitation of the scope of the present disclosure in any way. It will be apparent to those having skill in the art that changes may be made to the details of the above-described embodiments without departing from the underlying principles of the disclosure herein.

We claim:
1. A window blind comprising:
   at least two tilt strings;
   a plurality of slats, each of the plurality of slats comprising:
      two longitudinal sides each longitudinal side comprising a length, and
      two transverse sides, each transverse side comprising a width,
      wherein the length of each of the plurality of slats is at least five times the width, wherein each of the plurality of slats is mounted on the at least two tilt strings, wherein the plurality of slats performs a tilting movement in response to a movement of the at least two tilt strings thus reversibly moving the plurality of slats between an open position and a closed position, and wherein the two transverse sides of each of the plurality of slats are perpendicular to the at least two tilt strings when the plurality of slats is in an open position;

a hollow core;
an orifice, wherein the orifice leads into the hollow core, and wherein the orifice is positioned along one of the longitudinal sides;
at least one air pressure sensor disposed within the hollow core and positioned to detect a change in pressure in the area adjacent to the orifice;
a battery, wherein the battery is disposed within the hollow core; and
a controller, wherein the controller is disposed within the hollow core, wherein the controller is electronically connected to the at least one pressure sensor, wherein the controller comprises a memory, and wherein the memory comprises program code; and
a data communication device, wherein the data communication device transmits a first signal to a remote device when the at least one pressure sensor detects a change in pressure, and wherein the controller receives input data from the remote device through the data communication device.

2. The window blind of claim 1, wherein the at least one pressure sensor comprises one or more of the following pressure transducers: a strain gage pressure transducer, variable capacitance pressure transducer, and piezoelectric pressure transducer.

3. The window blind of claim 1, wherein the controller is electronically connected a plurality of light fixtures, wherein the program code prompts the controller to send a second signal to the plurality of light fixtures through the data communication device to actuate each of the plurality of light fixtures in a first sequence after the controller receives the first signal.

4. The window blind of claim 1, wherein the input data comprises the first sequence.

5. The window blind of claim 1, wherein the remote device is a mobile device.

6. The window blind of claim 3, wherein controller is electronically connected to the at least one pressure sensor and to a plurality of light fixtures through a wireless device.

7. The window blind of claim 6, wherein the wireless device comprises a Bluetooth device.

8. The window blind of claim 3, further comprising an audio device, wherein the audio device comprises an audio recording device, and wherein the audio device is electronically connected both to a plurality of audio speakers and to the controller, wherein the program code prompts the controller to send a subsequent signal to the audio device through the data communication device causing the audio device to actuate each of the plurality of audio speakers in a second sequence after the controller receives the first signal.

9. The window blind of claim 8, wherein the input data comprises the second sequence.

10. The window blind of claim 8, wherein audio recording device comprises at least one audio recording, wherein the at least one audio recording consists of one or more of the following sounds: a barking dog, a siren, a door opening, the sound of footsteps, and a human voice.

11. The window blind of claim 10, wherein the human voice is a recording of a user's voice.

12. The window blind of claim 11, wherein the recording of a user's voice is transmitted to the audio recorder through the remote device.

13. The window blind of claim 8, wherein the audio device is wirelessly connected to the plurality of audio speakers.

14. The window blind of claim 13, wherein the audio device is wirelessly connected to the plurality of audio speakers through a Bluetooth device.

15. The window blind of claim 1, further comprising an audio device, wherein the audio device comprises an audio recording device, wherein the audio device is electronically connected both to a plurality of audio speakers and to the controller, and wherein the program code prompts the controller to send a subsequent signal to the audio device through the data communication device causing the audio device to actuate each of the plurality of audio speakers in a defined sequence after the controller receives the first signal.

16. The window blind of claim 15, wherein the input data comprises the defined sequence.

17. The window blind of claim 15 wherein audio recording device comprises at least one audio recording, wherein the at least one audio recording consists of one or more of the following sounds: a barking dog, a siren, a door opening, the sound of footsteps, and a human voice.

18. The window blind of claim 17, wherein the human voice is a recording of a user's voice.

19. The window blind of claim 15, wherein the audio device is wirelessly connected to the plurality of speakers.

20. The window blind of claim 19, wherein the audio device is wirelessly connected to the plurality of speakers through a Bluetooth device.

* * * * *